Aug. 6, 1929.  F. B. THOMAS  1,723,218
WARNING DEVICE
Filed Jan. 21, 1928
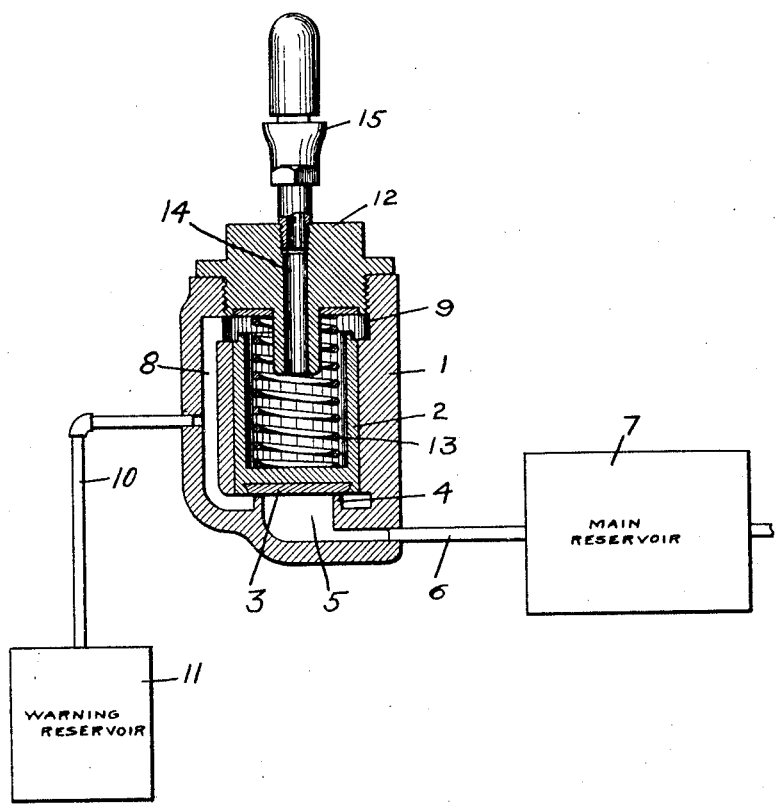
INVENTOR
FRANK B. THOMAS
BY *Wm. M. Cady*
ATTORNEY Patented Aug. 6, 1929.

1,723,218

UNITED STATES PATENT OFFICE.

FRANK B. THOMAS, OF WILKINSBURG, PENNSYLVANIA, ASSIGNOR TO THE WESTINGHOUSE AIR BRAKE COMPANY, OF WILMERDING, PENNSYLVANIA, A CORPORATION OF PENNSYLVANIA.

WARNING DEVICE.

Application filed January 21, 1928. Serial No. 248,519.

This invention relates to railway fluid pressure brake systems in which a main reservoir is employed on the locomotive and from which fluid under pressure is supplied to the brake system.

It may sometimes happen that the pressure of fluid stored in the main reservoir of a fluid pressure brake system may fall below a safe point without the engineer being aware of the fact, so that the engineer may find when he attempts to control the brakes, that the fluid pressure is inadequate.

The principal object of my invention is to provide means for warning the operator in case the pressure of fluid in the main reservoir falls below a predetermined degree.

In the accompanying drawing, the single figure is a sectional view of a device embodying my invention and shown associated with a main reservoir.

As shown in the drawing, the warning device may comprise a casing 1 having a cylindrical bore in which is mounted a valve piston 2. The piston 2 is provided at one end with a seat portion 3 adapted to engage an annular seat rib 4 and chamber 5 within the seat rib is connected by a pipe 6 with the usual main reservoir 7 of a fluid pressure brake system.

The space outside of the seat rib 4 is connected to a passage 8 which leads to the chamber 9 at the opposite side of the valve piston 2 and which is also connected by a pipe 10 with a warning reservoir 11.

A screw plug 12 is screwed into a threaded opening at the spring side of the valve piston and a coil spring 13 is interposed between the plug 12 and the valve piston 2. The plug 12 is provided with a passage 14 which opens into the chamber 9. A suitable whistle device 15 adapted to be operated by fluid under pressure is screwed into the plug 12 and communicates with passage 14.

When the pressure of fluid in the main reservoir 7 has been increased to a predetermined degree sufficient to overcome the pressure of the spring 13, the valve piston 2 will be lifted from engagement with the seat rib 4 and the full area of the valve piston 2 being then exposed to the pressure of fluid from the main reservoir, the valve piston is quickly shifted to its upper seat. Fluid under pressure from the main reservoir then flows to passage 8 and thence to the warning reservoir 11, so that the warning reservoir becomes charged with fluid under pressure.

If the pressure in the main reservoir should fall below a predetermined degree, which degree is determined by the pressure of the spring 13, the valve piston will be shifted to its lower seat against the seat rib 4 and by this movement communication is opened from the charged warning reservoir 11 to chamber 9, so that fluid under pressure is supplied through passage 14 to the warning whistle 15. The blowing of the whistle then warns the operator that the pressure in the main reservoir has fallen to a low degree and that it will be necessary for him to see that the pressure in the main reservoir is restored before proceeding further.

While one illustrative embodiment of the invention has been described in detail, it is not my intention to limit its scope to that embodiment or otherwise than by the terms of the appended claim.

Having now described my invention, what I claim as new and desire to secure by Letters Patent, is:

In a fluid pressure brake, the combination with a main reservoir, of a fluid pressure operated signal device, a signal reservoir, a spring, and a unitary valve piston subject to the opposing pressures of the main reservoir and said spring and operated upon a predetermined increase in main reservoir pressure for supplying fluid under pressure to said signal reservoir and operated upon a predetermined decrease in main reservoir pressure for supplying fluid under pressure from said signal reservoir to said signal device.

In testimony whereof I have hereunto set my hand.

FRANK B. THOMAS.